UNITED STATES PATENT OFFICE.

JOHN F. MANAHAN, OF LOWELL, MASSACHUSETTS.

IMPROVED MODE OF BURNING WET FUEL.

Specification forming part of Letters Patent No. 14,063, dated January 8, 1856; antedated July 8, 1855.

*To all whom it may concern:*

Be it known that I, J. F. MANAHAN, of Lowell, in the county of Middlesex, Commonwealth of Massachusetts, have invented an Improved Mode of Burning Wet Fuel, such as results from many operations in the arts, or is found naturally wet; and I do hereby declare that the following is a full and exact description thereof.

The nature of my invention consists in adding to such wet fuel, or matter intended as fuel, a body—such as volatile bituminous matter, which will burn in the vapor generated by heat from the water contained in the fuel and produce clear flame in the air.

To enable others skilled in the art to make and use my invention, I will proceed to describe my process by which waste wet vegetable matter may be converted into valuable fuel.

I take spent tanner's bark or spent dyewood as it comes from the vats, or peat, and allow it to drain until no more water runs from it, and, having spread it on a wooden platform about four inches thick, I mix it with bituminous matter and lay it aside for immediate use. The plan which I have adopted is the following: By means of a coil of pipe in a large cask coal-tar or other tar, or residuum from coal-tar, is heated by waste steam or otherwise. Near the bottom of the cask is a cock, through which the heated tar can flow when it is opened upon a sieve or pan with small orifices, which subdivide the stream into jets. The platform for the spent tan and other wet fuel or refuse is under the sieve, and when the material is spread, the cock being opened, the jets of bitumen in a heated state fall on it, and with one or two turnings by means of a shovel the tar and wet matter become mixed uniformly to form a fuel, which is then thrown into the store-bin for use. I use for a ton (two thousand pounds) of wet tanner's refuse bark about four hundred pounds of coal-tar. Such bark loses by drying in the air one-half its weight of water, becoming ten hundred pounds. Consequently for every ten hundred pounds of water in any wet matter intended for fuel I use four hundred pounds of coal-tar or pine-tar and a corresponding portion of coal-tar refuse from the naphtha manufactories. Within this limit the wet fuel burns in common steam-boiler furnaces rapidly, producing a voluminous flame without smoke, and affording a large amount of heat, enabling me to obtain the whole steam-power required in some works from coal-tar and the wet refuse produced.

It is well known that coal-tar and bitumen have been used for manufacturing fuel from dry powdered coal, sawdust, peat, &c. Now, my invention is apart from this course, and has for its object the production of a valuable fuel from wet materials without the expense of drying them, and it enables me to obtain the utmost amount of heat from both the bitumen and bark, sawdust, or peat without smoke. This effect is brought about by the vapor of the bitumen diffused in the steam by the heat coming in contact with the air present, whereby a perfect combustion of the hydrogen and carbon results, the steam becoming highly heated in the flame produced.

What I claim as invention, and wish to secure by Letters Patent, is—

The method of producing from wet vegetable matter a useful fuel by mixing it with coal-tar or other fluid bituminous matter of like character.

JOHN F. MANAHAN.

Witnesses:
SHUBAD P. ADAMS,
I. W. LUCAS.